2,992,946
PROCESS FOR REMOVING LEADED DEPOSITS FROM METAL
Benjamin Arden, Los Angeles, and Francis E. Clark, San Gabriel, Calif., assignors, by mesne assignments, to Purex Corporation, Ltd., a corporation of California
No Drawing. Filed May 25, 1955, Ser. No. 511,097
8 Claims. (Cl. 134—29)

This invention relates to removal of scale, e.g., in the form of lead and other metal oxides and salts and carbon deposits, formed on engine components, and is particularly concerned with novel procedure and compositions for the removal of lead-containing materials, carbon, and heat scale, deposited particularly on aircraft engine parts, and especially on the "hot" parts of jet engines and other engines, such as internal combustion reciprocating engines, and metal surfaces generally where similar deposits are found.

One important present application of the invention is to power plants of modern aircraft, particularly jet engines, such as turbojet and turboprop power plants, which are constructed from special heat resistant alloys and superalloys. During service the various component parts are exposed to high operating temperatures in the vicinity of 1000–1500° F. or even higher. At these elevated temperatures the metal alloys are exposed to both reducing and oxidizing atmospheres at various times, and, as a result, very tightly adherent scale deposits are formed on the hot parts of the engine.

Examples of components of jet engines which are covered with scale deposits are the combustion chamber inner liner, cross-over tubes, transition liner, turbine nozzle assembly, and turbine rotor assembly (with attached buckets), exhaust components, and, in some models, the after burner.

The types of scale formed on these engine parts include leaded scale, such scale being composed essentially of lead compounds, such as the oxides and halides of lead, e.g., PbO, $PbO_2$, $Pb_2O_3$, $Pb_3O_4$, and under some conditions some free lead, and $PbX_2$ where X is a halogen such as chlorine or bromine and in many cases it may also include other salts, such as phosphates and carbonates. Such deposits are also found on certain component parts of the piston type of internal combustion engines powered by leaded fuels. These salts will vary in color from white to yellow, orange, red, and brown. The composition of the deposit depends in large part on the composition of the fuel and the atmospheric environment in which it is burned, for example, fuels containing tetraethyl lead, organic halides and organic phosphates, such as tricresyl phosphates.

These deposits are also modified by organic additives which enter the combustion chamber, especially in reciprocating engines, with the lubricant and which combine with the lead to form various components of the deposits. Deposits thus formed by burning of fuels containing lead compounds are in this specification and these claims referred to as "leaded deposits."

Leaded deposits are thus formed at elevated temperatures because of the presence of lead-containing antiknock compounds in aviation (or other) fuel, and such deposits are frequently formed on metal surfaces which are covered with heat scale with which the leaded deposits are commingled and on which the leaded deposits may be found.

Also formed on the surface of the engine parts is a tough carbon or graphite scale which tightly adheres to the metal surfaces. In describing these scales as carbon or graphite scales we do not exclude the presence in the carbon deposit of high molecular weight asphaltene or asphaltic or tarry binders which are formed in the burning of the fuel. These deposits are found both intermingled with and deposited on the heat scale and leaded deposits. In many cases massive carbon deposits are formed because of severe conditions of engine operation, especially in the case of "hot" spots.

For proper maintenance of the engines, overhaul procedures must be applied during which the engine components are completely and safely cleaned of leaded deposits and deposits of carbon, if these are present in undesirable degree. The accumulation of leaded deposits is a health hazard and also interferes with inspection procedures.

One object of the invention is to remove leaded deposits formed on engine components, particularly, but not exclusively, the "hot" sections of aircraft engines, especially jet engines.

Another object is to devise a procedure and compositions for the efficient removal of leaded deposits and carbon deposits, if desired, from parts carrying the same.

Still another object is to provide procedure and compositions for cleaning surfaces of metal components of engines, particularly aircraft engines, encrusted with leaded deposits and carbon, to enable suitable inspection of the parts by production-line methods utilizing penetrant dyes or fluorescent materials.

A still further object of the invention is the provision of a method and compositions for accomplishing such descaling without producing any substantial or even measurable corrosion of the metal part during the cleaning or descaling cycle, so as to incur no significant weight loss or dimensional change of the metal or alloy of which the engine component is formed.

Other objects and advantages will be apparent from the description of our invention which follows:

We have found that leaded deposits, and also some carbon and heat scale, can be removed from engine parts, such as jet engine "hot section" components, by treatment of such parts in an alkaline solution at elevated temperature and containing a salt of an acid forming a complex with lead, the solution being highly alkaline and having a pH not less than about 13. The metals and alloys previously referred to are stable and not corroded in any substantial degree in solutions of such alkalinity.

The lead complex former employed can be an aliphatic hydroxy acid or a low molecular weight fatty acid, and strong alkalies such as alkali metal hydroxides are utilized to produce the desired high alkalinity. Temperature of treatment in the solution is generally in excess of about 200° F. While the aforementioned composition is sufficient in itself particularly for successful removal of leaded deposits on engine parts, such reagents have but limited value in removal of carbon deposits and of heat scale.

The aqueous alkali solution of the invention contains as its alkalinity producing agent an alkali metal compound which in solution gives free alkali metal hydroxide which may be potassium or sodium hydroxide. Potassium hydroxide is preferred although sodium hydroxide is also suitable. A substantial amount of alkali of this type is employed in order to attain the high pH values necessary for proper functioning of the solution. The pH of the descaling solution hereof is maintained substantially above 12, and is generally not less than about 13. Solutions of alkali which are preferred have values of the pH of the solution above about 13, and may be 14 or even higher. Actually, at such high pH values it is more common practice to describe the alkalinity in terms of percent sodium hydroxide or potassium hydroxide or some other equivalent alkali metal hydroxide. The amount of alkaline material employed may range to give in solution free alkali metal hydroxide equivalent to from about 4% to about 40% by weight alkali metal oxide, e.g. ($K_2O$, $Na_2O$) based on the weight of the solution. Preferably from about 10–25% of alkali, most desirably potassium hydroxide, is used to obtain the desired high alkalinity.

In the highly alkaline solutions are incorporated compounds in the form of certain salts, to act in conjunction with the alkali for converting leaded deposits to highly soluble lead complexes. Such agents are herein referred to as lead complexing agents. These salts are derived from an aliphatic hydroxy acid such as lactic, citric, tartaric, gluconic, glyceric, malic, glycollic, or saccharic acid. These salts or mixtures of these salts may be employed for the above purpose. Suitable salts for this purpose are also derived from a low molecular weight fatty acid such as acetic or propionic acid. These salts while having activity in converting the lead into soluble form are not as useful for this purpose in the solutions of this invention as are the salts of the hydroxy acids referred to above. These may be used effectively, particularly if used together with the hydroxy acids. The soluble salts of the above acids are employed, preferably employing the potassium or sodium salt, e.g., potassium or sodium acetate or potassium or sodium glycollate.

The salts of the hydroxy acids are not only more active in the removal of leaded deposits than are the salts of the fatty acids above referred to but also even when used in like molar concentrations in the alkaline systems, the activity of the salts continues at a high level on continued use in treating successive parts even without replenishment. On the other hand, the salts of the fatty acids fall off in activity rapidly on continued exposure of the solutions to parts coated with leaded deposits as the solutions are reused in treating additional parts.

The quantity of these salts added to the solution may vary, but generally from about 1 to about 45% by weight of such salts can be present in the treating solution in water, amounts of about 4 to about 40% usually being employed. These salts can be used separately or in admixture with each other.

While the invention is not to be limited as to any theory of operation, the following is given as applicants' theory of the function of the highly alkaline solution hereof for the removal of leaded deposits from metallic engine parts. The high concentration of alkali metal hydroxide converts the leaded deposits to plumbite and plumbate salts. This conversion takes place more readily at high alkali concentration. However, the rate of penetration is slow and the conversion of the leaded deposits to solubles and easily removable lead compounds is incomplete.

The combined action of alkali and complex ion formation by reaction with the lead complexing agents rapidly converts massive and adherent lead oxide and salt deposits, essentially insoluble or difficultly soluble in water or dilute alkaline solutions, to soluble forms of lead compounds. The conversion to the soluble lead form is materially aided by the presence of the complexing salts. In addition to the chemical dissolving action, leaded deposits in direct contact with the metallic or scaled metallic surface, are loosened to such a degree that rinsing procedures with water, preferably by pressure rinse with water or steam pressure knocks off these remaining leaded deposits completely. The above treatment is effective to remove leaded deposits usually encountered in engines.

To achieve removal of stubborn leaded deposits which are not completely removed by the above treatment, or to increase the rate of the removal of leaded deposits, the treating composition is controlled to provide a material which may be operated consistently as a water solution at high operating temperatures in the range of about 220° to 300° F. Particularly for removal of leaded deposits, solution temperatures of about 235° F. to 280° F. are generally maintained with a preferred temperature range of about 255° to 275° F. An important additional effect of maintaining alkalinity of the solution at high pH values noted above and of the presence of the complexing agent, is that it raises the boiling point, i.e., reduces the vapor pressure of the solution. However, as a practical matter the solution may not, except in the higher ranges of concentration given in the examples herein, be heated above about 212° F. without excessive evaporation of water.

Over a period of time, with reuse of the solution on parts to be cleaned, at the high temperatures of operation noted above, water evaporates from the solution of the alkali and complexing agent referred to above and care must be taken to be sure that the concentration of the alkali and salts does not become so excessive as to cause precipitation on the parts to be cleaned. Evaporation is reduced to a practical controllable minimum to permit reuse of the solution by the use of from about 30 to 65% by weight of water in the solution, generally about 35 to 50% by weight of water, in conjunction with a high boiling compatible (or water soluble) organic solvent having a low vapor pressure at the temperatures up to about 300° F. Such solvents can be polyols or alkanolamines. Examples of suitable polyols, particularly diols and triols, along with their boiling points and vapor pressures (at 20° C.) are as follows:

TABLE I

| Name | Boiling pt. at 760 mm. pressure | | Vapor pressure, mm. Hg, at 20° C. |
|---|---|---|---|
| | ° C. | ° F. | |
| Ethylene glycol | 198 | 388 | 0.05. |
| Diethylene glycol | 255 | 442 | Less than 0.01. |
| Triethylene glycol | 291 | 524 | Less than 0.01. |
| Dipropylene glycol | 232 | 417 | 0.01. |
| Glycerol | 290 | 522 | Les than 0.01. |
| Sorbitol. M.P., ° C | 97 | | Vapor pressure in 70% aqueous solution less than 0.01. |

The compatible polyols and alkanolamines which can be used for purposes of the invention are the polyols and alkanolamines and preferably polyalkanolamines having boiling points, in the pure state, of 400° F. and higher and having preferably a vapor pressure at 20° C. of less than 0.01 mm. of mercury. By compatible polyols and alkanolamines we mean those which form stable dispersions or solutions in the water system of the composition of our invention at the operating temperatures of 200 to 300° F. and are not decomposed by pyrolysis at such temperatures under the conditions of proposed use. Examples of the polyalkanolamines with their boiling points and vapor pressures (at 20° C.) are set out below.

TABLE II

| Name | Boiling pt. at 760 mm. pressure | | Vapor pressure mm. Hg, at 20° C. |
|---|---|---|---|
| | ° C. | ° F. | |
| Diethanolamine | 250 | 480 | Less than 0.01. |
| Triethanolamine | 360 | 680 | Do. |
| N-aminoethyl ethanolamine | 244 | 471 | Do. |
| N-methyl diethanolamine | 247 | 476 | Do. |
| N-ethyl diethanolamine | 252 | 485 | Do. |
| Diisopropanolamine | 249 | 480 | Do. |
| Triisopropanolamine | 306 | 583 | Do. |

Other suitable polyalkanolmonoamines are N,N-dihydroxyethyl glycine, and glycol or polyglycol derivatives of triethanolamine and polyetherglycol derivatives of triethanolamine having the general constitutional formula

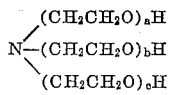

where $a+b+c$ equals from 3–6, both inclusive.

We may also use polyalkanolpolyamines having boiling points above 400° F. and similar low vapor pressures such as the polyalkanolpolyamines referred to below. We may use such polyalkanolpolyamines in the place of the polyalkanolmonoamines or the polyols in like weight proportions or employ the polyalkanolpolyamines together with the polyalkanolmonoamines in the above ratio and manner described hereinbelow to assist and improve the carbon and heat scale removal and with equal effectiveness remove the leaded deposits.

We have found that by addition of a polyalkanolpolyamine to the above alkali solutions containing the lead complexing agents, the removal of tenacious carbon deposits often formed on hot parts of engines, particularly jet engines, may be facilitated. The amount of the polyalkanolpolyamines to be added is decreased by employing the polyalkanolpolyamines together with the polyalkanolmonoamines as described herein, and in our preferred embodiment, we employ the polyalkanolpolyamines together with the polyalkanolmonoamines. The result is an improvement in overall cleaning ability and performance particularly in the rate of removal of the carbon.

Examples of suitable polyalkanolpolyamines for purposes of the invention are as follows:

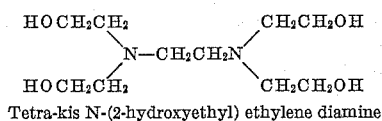

Tetra-kis N-(2-hydroxyethyl) ethylene diamine and

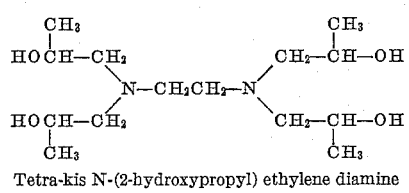

Tetra-kis N-(2-hydroxypropyl) ethylene diamine and N,N-dihydroxyethyl ethylene diamine, tetraethanol propylene diamine, pentaethanol diethylenetriamine, and hexaethanol triethylenetetramine. The preferred compounds of this type are the polyalkanoldiamines, in particular N,N,N',N' tetra-kis(2-hydroxypropyl)ethylenediamine and the 2-hydroxyethyl analog. The amount of polyalkanolpolyamine employed can vary. When used together with polyalkanolamines the amount generally used is in the range of about 0.2 to 5% by weight of the solution, employing therewith additional polyalkanolmonoamines sufficient to make the total polyalkanolamine content preferably equal to about from 10 to 25% of the solution.

The polyalkanolmonoamines, and specifically triethanolamine, are the preferred types of alkanolmonoamines. As between the polyols and alkanolamines, the latter are preferred for reasons pointed out more fully below. However, it is understood, of course, that one or more of these solvents may be employed in admixture. For example, a polyalkanolamine such as triethanolamine can be employed together with a polyol such as ethylene glycol in the same alkali treating solution according to the invention.

The alkali solution containing a lead complexing agent and polyol solvent, as described above, is highly effective for removal of leaded deposits and also removes some of the carbon and smut deposits. However, when an alkanolamine such as triethanolamine is employed as solvent in the alkali solution, such solvent has the additional effect of enhancing carbon removal, so that a more thorough descaling in this respect is accomplished.

The amount of high boiling compatible solvent which can be employed generally ranges from about 1 to about 30% by weight of the solution, and usually is in the range of about 5 to 25%, by weight, with about 10 to 25% preferred when employing polyalkanolamines as the solvent. When using polyalkanolpolyamines, the amount employed will depend on their solubility and if insufficiently soluble the polyamines can be supplemented by addition of polyalkanolmonoamines. However, the quantity of solvent used can be varied as desired, in conjunction with the concentration of alkali and lead complexing salt present, to obtain a solution having the desired characteristics. The organic solvent is chosen with boiling point ranging above about 400° F. and having other properties such as efficacy in removal of carbon described herein.

We have also found that phenols in the form of alkali metal phenates, such as the potassium and sodium phenates, when added to the solutions of the invention aid substantially in promoting carbon removal. Thus, we may employ the phenols, i.e., the monatomic phenols such as hydroxybenzene and its homologues including cresol and cresylic acid, polyatomic phenols such as the dihydroxybenzenes and its homologues, triatomic phenols such as pyrogallol and its homologues, and higher polyphenols, which are sufficiently acid to form salts with alkali at the concentrations employed which are soluble in the aqueous compositions of our invention at the temperature of the treatment, to-wit, at 200–300° F. The alkali metal salts we have found effective in this respect are the salts of phenol itself, the ortho, meta and para dihydroxy benzenes, and of the trihydroxy benzenes such as pyrogallic acid. These materials are generally compatible with our alkali solutions. Hence, such materials can be employed as additive to the treating reagent. It may be used in place of the polyols or alkanolamines to give some improvement effective in further aiding carbon removal and assist in raising the boiling point, i.e. suppress the vapor pressure of the solution. Such phenates may be employed in amounts ranging up to about 20% by weight of the solution, generally about 3 to 15%. However, the addition of the polyols or alkanolamines to such solutions gives a large improvement in the removal of the carbon deposits and of the leaded deposits and of heat scale.

The alkanolamines in addition to their effect on the boiling point of the solutions have in themselves an influence on the chemical reactivity of the solution in removal of leaded deposits and carbon deposits. The effectiveness of the alkanolamines on the removal of leaded deposits is greatly enhanced by maintaining suitably high concentrations of the alkanolamines and of alkali in the treating solution in addition to suitable concentrations of the salts of the hydroxy acids.

The compositions of our invention containing alkanolamines or its equivalent alcoholates include from 10 to 25% of alkali metal hydroxide, 4 to 40% of the complexing agent, from 0 to 15% of phenates and from 10 to 25% of alkanolamines and sufficient water to make 100% by weight, employing at least about 25% of water in the solution. As a further improvement we may adjust the above ratios of the components of the composition so that there is little and preferably an inconsequential amount of water evaporated at the treating temperature. The above mixtures have a boiling point which is in the range from 220° to 300° F. and is preferably higher than the average temperature of the bath.

While we do not wish to be bound by any theory of the reaction, we do not exclude the possibility that in the aqueous solution more or less of the alkanolamines are reacted with alkali to form the equivalent alcoholates and the ultimate compositions as described are intended to include such possible conversion.

In employing the above ingredients to form an alkaline solution, we may adjust the quantities so that the alkali employed may be divided between free alkali and alkali bound as alcoholates of the alkanolamine and dissolve the mixture in water.

In practice the treating and removing composition of the invention is heated in a suitable container or tank, e.g., constructed of stainless steel or Monel metal, to the operating temperature, and the engine parts encrusted with leaded deposits, which may or may not carry carbon, are immersed therein. Temperature of the solution during treatment is maintained in the range of 200–300° F., usually 235 to 280° F. The preferred temperature range is about 255 to 280° F. The solution has a boiling point higher than the treating temperature and is in excess of about 220–300° F. and usually about 300° F. Where the tank is heated by steam coils, the temperature adjacent the coils may be above the boiling temperature. However, the average temperature of the solution is as stated. The time of treatment in the above alkaline solution is generally from about 15 minutes to about 2 hours, depending on the amount and tenacity, particularly as regards carbon, of the scale to be removed. Usually from 30 to 45 minutes at about 270° F. is sufficient for this purpose. The parts are then withdrawn from the solution and spray rinsed with either cold or warm water.

The alkali solutions described above for removing scale produce no measurable corrosion of the metal of which the engine part is constructed, during the cleaning or descaling operation. Hence, no weakening or dimensional change in the metal part is effected by the invention process.

While the process and solutions described above employing the polyalkanolmonoamines for removal of leaded deposits also are effective for removal of carbon deposits, in many instances extremely hard, massive, and highly adherent carbon deposits are formed during severe conditions of engine operation, which are most difficult to remove by the above procedures without exposing the parts for prolonged and impractical and inconvenient periods of time.

Practically 100% removal of leaded deposits is obtainable by use of our alkali solutions containing the complexing agent, within the above-noted periods of treatment. Using the solutions which do not contain the polyalkanolpolyamine, the amount of carbon removal may be between 75 and 90%, depending on the density and the character of the carbon deposit, whereas practically 100% of the carbon of the hard and dense kind encountered in extreme cases can be removed under the same conditions but employing alkali solutions including a polyalkanolpolyamine such as N,N,N',N' tetrakis (2 hydroxypropyl)ethylenediamine. We have found that (depending on the character of the carbon deposit) employing the solutions of our invention containing polyalkanolamines and not containing polyalkanolpolyamines, we may remove about 100% of the carbon deposit encountered in jet engines and about 75% of the carbon found in jet engines operating under adverse conditions.

We may however treat the part in stages. Thus, we may first treat the part with an alkali solution containing the complexing agent and no polyol or polyalkanolamine or polyalkanolpolyamine at relatively moderate temperatures, for example 180–220° F., and remove a major amount of the leaded deposits and such light carbon which is relatively loosely attached. We may then follow the treatment with a second treatment with the compositions of our invention containing the aforesaid polyalkanolamines in the manner described above to produce a complete removal of the obdurate highly resistant leaded deposits and carbon, or we may employ as an initial treatment the compositions of our invention containing the polyols and/or polyalkanolmonoamines in the manner described above and follow this treatment with the compositons of our invention employing the polyalkanolmonoamines and also the polyalkanolpolyamines in the manner described herein. A retreatment with the polyalkanolpolyamine solutions will produce a clean and bright part. By this procedure, we may reduce the time of treatment with each reagent, and also we economize in the use of the more expensive organic reagents.

The following examples are given to illustrate the application of our invention employing the various treating reagents and the comparative results obtained.

*Example 1*

A combustion chamber inner liner having a heavy leaded deposit and heat scale and carbon was treated with the following solution at 200–210° F.:

|  | Percent by weight |
|---|---|
| Sodium hydroxide | 16.0 |
| Sodium acetate | 1.6 |
| Potassium sodium tartrate | 2.4 |
| Water | 80.0 |
|  | 100.0 |

It required 15 minutes to remove the leaded deposit and after 1 hour of treatment but a fraction, estimated as from 5–10%, of the lightly adherent carbon and heat scale was removed. Lightly adherent carbon was washed off, but the hard graphitic carbon forming the major portion of the carbon deposit was not removed, nor was it removed after 1½ hours of exposure.

The same treatment applied to an exhaust system collector ring of an internal combustion engine required 1½ hours for complete removal of the leaded deposit.

*Example 2*

Comparing this result with the use of caustic soda alone (15% solution at 200–210° F.) a similar combustion chamber inner liner, taken from an engine operating under the same conditions and like service and having a closely similar type of deposit as in the above case required 1 hour for removal of most of the loosely adherent leaded deposit but the underlying or tightly adherent leaded deposits were not removed and only a fraction of the adherent carbon deposit and heat scale was removed. The part was not cleaned. In 15 minutes only a relatively small portion of the leaded deposit was removed.

When an exhaust system collector ring from an internal combustion engine was treated with the above caustic solution it took 3 hours to remove about 80% of the leaded deposit.

*Example 3*

An inner liner similarly contaminated as in Example 1 was treated under the same conditions as in Example 1 at 200–210° F. with the following reagent:

|  | Percent by weight |
|---|---|
| Potassium hydroxide | 17 |
| Triethanolamine | 15 |
| Water | 68 |
|  | 100 |

It took 35 minutes to remove all of the leaded deposits and only a portion of the carbon. However, this was better than in Example 1.

The following example illustrates the comparative effectiveness of a salt of the hydroxy acids referred to above as compared with that of the low molecular weight fatty acids in the removal of leaded deposits in the high temperature alkaline systems of this invention:

*Example 4*

Panels constituting the inner liner of the combustion chamber of a jet engine which contained closely similar heavy leaded deposits were each subjected to heat at 200° F. in the following solutions:

Solution 1 was made by mixing 56.5 parts by weight of water and 15 parts by weight of dry potassium hydroxide with 6 parts by weight of acetic acid and 22.5 parts by weight of triethanolamine.

Solution 2 was made in the above manner using instead 57.7 parts instead of 56.5 parts by weight of water, 6.0 parts by weight of commercial glycollic acid containing 70% of glycollic acid, and employing 21.3 parts by weight of triethanolamine.

Solution 2 removed about 90% of the leaded deposits in 10 minutes while solution 1 removed only about 30% of the leaded deposits. In 20 minutes solution 2 removed all of the leaded deposits while solution 1 removed only about 80% of the leaded deposits.

*Example 5*

A composition according to this invention consisting of free potassium hydroxide, potassium salts which complex and solubilize lead ions, water, and water compatible non-volatile solvent is as follows:

| Ingredient: | Composition A, Percent by weight |
|---|---|
| Potassium glycollate | 22.50 |
| Potassium acetate | 6.53 |
| Potassium hydroxide | 16.64 |
| Potassium phenoxide | 5.81 |
| Triethanolamine | 13.82 |
| Water | 34.70 |
| | 100.00 |

Uniform homogeneous compositions of this type are prepared by mixing the above ingredients, or more conveniently, in practice, by dissolving the equivalent proportion of commercial potassium hydroxide in the water-triethanolamine solvent mixture and forming the respective potassium salts by proportionate additions of the corresponding free acids, namely, glycollic acid, acetic acid, and phenol.

The scale remover composition A is heated in a suitable container or tank, constructed of stainless steel or Monel, to a temperature of 255–275° F., preferably at 270° F. plus or minus 5° F., and engine parts heavily contaminated with leaded deposits and carbon scale are immersed for a period from 15 minutes to 90 minutes in the solution. For example, an inner liner of a combustion chamber of an engine with a heavy deposit will be cleaned in about 15 minutes in the average case. A particularly obdurate part, such as for example the aft section of the combustion chamber inner liner of a jet engine may take 90 minutes. A power recovery turbine wheel on a turboprop engine may take 10 minutes. The parts are removed and spray rinsed with a pressure spray of either cold or warm water or steam. Leaded deposits are completely removed, along with most but not all of the carbon. The amount of the heat scale and carbon removed in the above periods of time is much greater than can be obtained by the treatment employed in Examples 1 to 3 on like parts for the same period of time.

The above treatment is effective in removal of carbon deposits found in the usual case. However, as will be described below, carbon deposits are sometimes encountered in engine deposits which are not removed by the above treatment. In such case the removal may be effected by employing together with the triethanolamine or any equivalent polyalkanolmonoamine employed, some polyalkanolpolyamine, as is described herein.

Further illustrating the results obtained, an inner liner of a jet engine combustion chamber was treated with the above solution for 5–10 minutes at 270° F. and all of the leaded deposits were removed, and treatment at the above temperature for under one hour gave 100% removal of the carbon deposit.

An inner liner of a second jet engine when treated with the above solution containing triethanolamine gave only 80% removal of carbon in two hours, the carbon being of extremely thick and of especially obdurate and resistant character.

A turbine bucket of a jet engine was treated with the above solution containing the triethanolamine at 275° F. for 1 hour and resulted in a complete carbon removal.

Reciprocating engine exhaust system collector rings were treated in the above manner with the above solution A for three quarters of an hour at 270–275° F. and gave complete removal of the leaded deposits.

*Example 6*

The inner liner of a combustion chamber of a jet engine (fabricated from a stainless steel or a heat resistant alloy), with heavy leaded deposit and with carbon is immersed in the composition A of Example 5 at 270° F. Leaded deposits are completely dissolved and rinsed away and the carbon deposits materially reduced after 45 to 90 minutes, the time depending on the degree of contamination.

*Example 7*

A combustion chamber inner liner for a jet engine contaminated in a manner equivalent to that of Example 1 was treated according to the procedure of Example 5 at 270–275° F. employing the following solution:

| | Percent by weight |
|---|---|
| Sodium hydroxide | 12 |
| Sodium acetate | 12 |
| Potassium glycollate | 15 |
| Triethanolamine | 15 |
| Water | 46 |

All of the leaded deposit was removed in 5 to 10 minutes and about half of the refractory heat scale and all of the carbon was removed after one hour treatment. Turbine buckets from a turbojet engine were treated with the above solutions at 270–275° F. and all of the carbon was removed in about 3 to 3½ hours treatment.

Stainless steel exhaust stacks of an internal combustion engine when treated in the above manner were completely cleaned of carbon by treatment for about 1½ to 2 hours.

The parts were then rinsed in a manner equivalent to that described under Example 5.

*Example 8*

Composition A of Example 5 is changed by replacing 3 parts by weight of triethanolamine per 100 parts of the composition with 3 parts by weight of N,N,N',N' tetra-kis (2-hydroxypropyl) ethylene diamine, to form a solution of composition B, which is the same as composition A except that it contains 10.82% by weight triethanolamine and 3% by weight N,N,N',N' tetra-kis (2-hydroxypropyl) ethylene diamine.

A combustion chamber inner liner covered with thick carbon deposits in the dome section of the type referred to in Example 5 is immersed in composition B at 270–275° F. for 2 hours, in the manner described in connection with Example 5, and then spray rinsed. The leaded deposit and carbon deposits are completely removed.

An inner liner similarly contaminated to that reported in the Example 5 as giving but an 80% carbon removal when treated by the procedure and the reagent of Example 5, when treated in the same manner as in Example 5 and with the same reagent except that it contained also the above polyalkanolpolyamine, resulted in 100% of carbon removal after 1½ hours treatment. This may be compared with the results given in Example 5 for the similar inner liner employing the reagent of Example 5 and which gave but 80% removal after two hours treatment.

A turbine bucket of a jet engine similar to that described in connection with Example 5 and similarly contaminated when treated under the same condition as given under Example 8 employing the reagent containing the polyalkanolpolyamine given above gave, after one hour treatment, complete carbon removal.

The introduction of the N,N,N',N' tetra-kis (2-hydroxypropyl) ethylenediamine compound in composition A materially improves the decarbonizing and descaling rate of the resulting composition B.

Results similar to those of the examples employing triethanolamine are obtainable by employing a solution like that of the composition of the above examples except that the triethanolamine is replaced by the same quantity of diethanolamine.

Results similar to those of examples employing N,N,N',N' tetra-kis (2-hydroxypropyl) ethylenediamine are obtainable by employing a solution like that of composition B in the above examples except that the N,N,N',N' tetra-kis (2-hydroxypropyl) ethylene diamine is replaced by the same amount of tetraethanol ethylene diamine or tetra-kis N,N,N',N' (2-hydroxyethyl) ethylene diamine, as for example employing the composition of Example 8 or its equivalents as described above.

The process and compositions hereof have many advantages. Thus, our invention affords complete removal of adherent leaded deposits, complete removal of both massive and tightly adherent carbon deposits, which if left on the component part might result in damage to the alloy due to carbide formation and precipitation.

The solutions of this invention have long tank life, and effective performance during life of the bath, when used to remove the stubborn leaded deposits. It is applicable to a wide variety of stainless steels, heat resistant alloys, and super-alloys, without incurring measurable chemical attack and without causing corrosion or dimensional loss of these metals. The versatile and extensive cleaning action is achieved by this process by simple immersion in a heated chemical bath, and is far superior to elaborate and only partially effective mechanical methods of cleaning, such as grit blasting, or vapor blasting. Clean surfaces of metal components are produced, suitable for inspection by production-line methods utilizing penetrant dyes or fluorescent materials.

In all of the preceding examples and uses we may, if we desire, add to the treating solution suitable wetting agents which are stable in the alkaline solution, such as sodium salts of the fatty acids of sufficiently low molecular weight to avoid gelation of the solution, or of the sulfonated fatty acids, or the alkyl aryl sulfonic acid, or any other alkali stable wetting agent.

The compositions of our invention may be packaged in an anhydrous condition and dissolved in water to make the treating baths, and in said case this invention includes mixtures not in water solution, as well as the novel water solutions thereof. The weight percentage of the various components in the anhydrous mixtures are readily ascertainable from the data previously given by simple arithmetical calculation.

The solutions described above may be repeatedly used in the procedures described. After cleaning of the metallic parts the solutions may be repeatedly used on other metallic pieces to be cleaned according to this invention. The partially spent solutions may be fortified by adding additional ingredients to maintain their concentration within the ranges specified, and the fortified solution employed in the above procedures. While the solutions have been described above according to their content when freshly compounded for use according to this invention, this description does not exclude the possibility that transformations during use may occur. Thus, for example, oxidation of the alkanolamines to the corresponding carboxylates may occur in part, and thus the ingredients of the solution be changed in some respects during use without substantially impairing the utility of the solutions for the uses described. Such used solutions are within the scope of the invention disclosed and claimed herein.

While we have described a particular embodiment of our invention for purposes of illustration, it should be understood that various modifications and adaptations thereof may be made within the spirit of the invention as set forth in the appended claims.

The invention claimed is:

1. The method of removing leaded deposits from a metallic part carrying the same, which comprises contacting said metallic part at an elevated temperature with a solution containing from about 4 to about 40 parts by weight of alkali metal hydroxide calculated as alkali metal oxide and from about 1 to about 45 parts by weight of a lead complexing agent chosen from the group consisting of the water soluble alkali metal salts of the fatty acids of 1 to 4 carbon atoms and the hydroxy aliphatic acids, said hydroxy aliphatic acids being chosen from the group consisting of lactic acid, citric acid, tartaric acid, gluonic acid, glyceric acid, malic acid, glycollic acid and saccharic acid, and reacting said solution with said leaded deposits to remove the same from said metallic part.

2. The process of claim 1, said solution containing at least 25 parts by weight of water.

3. The method of removing leaded deposits from a metallic part carrying the same, which comprises contacting said metallic part at an elevated temperature with a solution containing from about 4 to about 40 parts by weight of alkali metal hydroxide calculated as alkali metal oxide and from about 1 to about 45 parts by weight of a lead complexing agent chosen from the group consisting of the water soluble alkali metal salts of the fatty acids of 1 to 4 carbon atoms and the hydroxy aliphatic acids, said hydroxy aliphatic acids being chosen from the group consisting of lactic acid, citric acid, tartaric acid, gluconic acid, glyceric acid, malic acid, glycollic acid, and saccharic acid, and reacting said solution with said leaded deposits to remove the same from said metallic part, and further treating said metallic part with a second solution in a second step at an elevated temperature, said solution containing from about 4 to about 40 parts by weight of alkali metal hydroxide calculated as alkali metal oxide and from about 1 to about 45 parts by weight of a lead complexing agent chosen from the group consisting of the water soluble alkali metal salts of the fatty acids of 1 to 4 carbon atoms and the hydroxy aliphatic acids, said hydroxy aliphatic acids being chosen from the group consisting of lactic acid, citric acid, tartaric acid, gluconic acid, glyceric acid, malic acid, glycollic acid and saccharic acid, and at least 25 parts by weight of water and from 5 to 30 parts by weight of a polyalkanolamine having a boiling point of at least 400° F.

4. The process of claim 3 in which said polyalkanolamine is a polyalkanolmonoamine.

5. The process of claim 3 in which said polyalkanolamine is triethanolamine.

6. The process of claim 3 in which the polyalkanolamine is a mixture of a polyalkanolmonoamine and a polyalkanolpolyamine.

7. The process of claim 6 in which said polyalkanolmonoamine is from about 50 to 98% by weight of the mixture of the polyalkanolmonoamine and polyalkanolpolyamine.

8. The process of claim 7 in which the polyalkanolmonoamine is triethanolamine.

References Cited in the file of this patent

UNITED STATES PATENTS

| | | |
|---|---|---|
| 1,787,789 | Lovell et al. | Jan. 6, 1931 |
| 2,396,938 | Bersworth | Mar. 19, 1946 |

(Other references on following page)

UNITED STATES PATENTS

| | | | |
|---|---|---|---|
| 2,408,096 | Pierce et al. | Sept. 24, | 1946 |
| 2,544,649 | Bersworth | Mar. 13, | 1951 |
| 2,584,017 | Dvorkovitz et al. | Jan. 29, | 1952 |
| 2,626,879 | Lazar | Jan. 27, | 1953 |
| 2,671,036 | Obermeit | Mar. 2, | 1954 |
| 2,739,883 | Newman | Mar. 27, | 1956 |
| 2,777,818 | Gambill | Jan. 15, | 1957 |
| 2,806,060 | Bersworth et al. | Sept. 10, | 1957 |
| 2,843,509 | Arden | July 15, | 1958 |

OTHER REFERENCES

Condensed Chemical Dictionary, 4th ed., page 288, pub. by Reinhold Pub. Corp., New York, 1950.

Mehltretter et al.: Ind. & Eng. Chem., December 1953, pages 2782–2784.

Versene: Tech. Bull. No. 2, Sec. I, pages 17, 19, 21 and 23; Sec. II, pages 37–39, pub. by Bersworth Chemical Co., Framingham, Mass., July 1952.

Chemical Formulary, by Bennett, vol. VIII, pages 281, 349, 351, pub. by Chem. Pub. Co. (1948), Brooklyn, N.Y.

Handbook of Chemistry and Physics, 28th ed., pages 398–403, pub. by Chemical Rubber Co., Cleveland, Ohio (1944).

Sequestrene, pp. 2–12 and 36 (1952), pub. by Geigy Chemical Corp., New York.